(12) United States Patent
Engelke et al.

(10) Patent No.: US 6,882,707 B2
(45) Date of Patent: Apr. 19, 2005

(54) METHOD AND APPARATUS FOR TRAINING A CALL ASSISTANT FOR RELAY RE-VOICING

(75) Inventors: Robert M Engelke, Madison, WI (US); Kevin R. Colwell, Middleton, WI (US); Troy D. Vitek, Madison, WI (US); Kurt M. Gritner, Madison, WI (US); Jayne M. Turner, Madison, WI (US); Pamela A. Frazier, Mount Horebz, WI (US)

(73) Assignee: Ultratec, Inc., Madison, WI (US)

( * ) Notice: Subject to any disclaimer, the term of this patent is extended or adjusted under 35 U.S.C. 154(b) by 691 days.

(21) Appl. No.: 09/790,413

(22) Filed: Feb. 21, 2001

(65) Prior Publication Data

US 2002/0114429 A1 Aug. 22, 2002

(51) Int. Cl.⁷ .............................................. H04M 11/00
(52) U.S. Cl. ...................... 379/52; 379/88.01; 704/271
(58) Field of Search ................................. 379/52, 88.01, 379/88.02, 88.04; 704/235, 270, 270.1, 271

(56) References Cited

U.S. PATENT DOCUMENTS

| | | | | |
|---|---|---|---|---|
| 5,351,288 A | | 9/1994 | Engelke | 379/98 |
| 5,393,236 A | * | 2/1995 | Blackmer et al. | 434/169 |
| 5,487,671 A | * | 1/1996 | Shpiro et al. | 434/185 |
| 5,503,560 A | * | 4/1996 | Stentiford | 434/167 |
| 5,724,405 A | | 3/1998 | Engelke | 379/52 |
| 5,766,015 A | * | 6/1998 | Shpiro | 434/156 |
| 5,799,273 A | * | 8/1998 | Mitchell et al. | 704/235 |
| 5,850,627 A | * | 12/1998 | Gould et al. | 704/231 |
| 5,909,482 A | | 6/1999 | Engelke | 379/52 |
| 5,974,116 A | | 10/1999 | Engelke | 379/52 |
| 6,324,507 B1 | * | 11/2001 | Lewis et al. | 704/243 |

* cited by examiner

*Primary Examiner*—Scott L. Weaver
(74) *Attorney, Agent, or Firm*—Quarles & Brady LLP

(57) ABSTRACT

A training method and apparatus to train a call assistant to operate a telephone relay system for the hearing impaired that uses a re-voicing technique to produce near real-time transcription of a telephone conversation for display on a caption telephone or other device. The invention simulates an actual relay call as realistically as possible and produces a report on the skill of the particular call assistant being trained.

26 Claims, 4 Drawing Sheets

METHOD AND APPARATUS FOR TRAINING A CALL ASSISTANT FOR RELAY RE-VOICING

CROSS-REFERENCE TO RELATED APPLICATIONS

—

STATEMENT REGARDING FEDERALLY SPONSORED RESEARCH OR DEVELOPMENT

—

BACKGROUND OF THE INVENTION

The present invention relates to the training of relay call assistants and specifically to training call assistants to facilitate relay calls using a re-voicing technique.

A system for real-time transcription of remotely spoken voice signals is described in U.S. Pat. No. 5,909,482 assigned to the same assignee as the present invention and hereby incorporated by reference. This system may find use implementing both a "captel" (caption telephone) in which a user receives both voice and transcribed text through a "relay" from a remote second party to a conversation, and a "personal interpreter" in which a user receives through the relay a text transcription of words originating from the location of the user.

In either case, a human "call assistant" at the relay, listens to the voice signal and "re-voices" the words to a speech recognition computer program tuned to that call assistant's voice. Re-voicing is an operation in which the call assistant repeats, in slightly delayed fashion, the words she or he hears. The text output by the speech recognition system is then transmitted to the captel or personal interpreter. Re-voicing by the call assistant overcomes a current limitation of computer speech recognition programs; that they need to be trained to a particular speaker and thus, cannot currently handle direct translation of speech from a variety of users.

In order for the relay system to work properly, the call assistants must be properly trained. Re-voicing is not a natural process, and call assistants need an opportunity to practice re-voicing before becoming proficient enough to be able to handle actual telephone relay calls efficiently. Additionally, certain situations that call assistants may encounter in actual relay calls may present particular difficulties to the call assistant. Simulated experience in dealing with these difficult situations will help maintain a high level of service when such situations actually arise.

BRIEF SUMMARY OF THE INVENTION

The present invention provides a method for training call assistants to use a re-voicing system, as well as an apparatus allowing a call assistant to be trained in as realistic situations as possible. The invention also provides the call assistants and those responsible for their training with a gauge of the performance of each call assistant according to several different criteria.

The invention provides a method for training call assistants that utilizes linked text and voice scripts. The call assistant re-voices each script by listening to the voice portion, and the call assistant's re-voicing is transformed by a voice recognition program into an output text file that can be compared with the corresponding original text file. This comparison allows a report card to produced for each call assistant showing the re-voicing rate, error rate, etc.

Without the invention, two other people would be needed to assist for a call assistant to practice a relay call—one to play the role of the hearing party and the other the role of the hearing impaired user. The invention automates the roles of the other two parties, significantly reducing the expense of training a call assistant.

The invention also seeks to simulate an actual relay session and the re-voicing process as accurately as possible. Therefore, it includes such features as a foot pedal or other switch to pause the playback of the voice file, simulating the buffering of text by the actual relay system, and a display allowing for the call assistant to correct re-voicing errors, simulating the correction process of the actual re-voicing system.

In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE INVENTION

Figure 1:
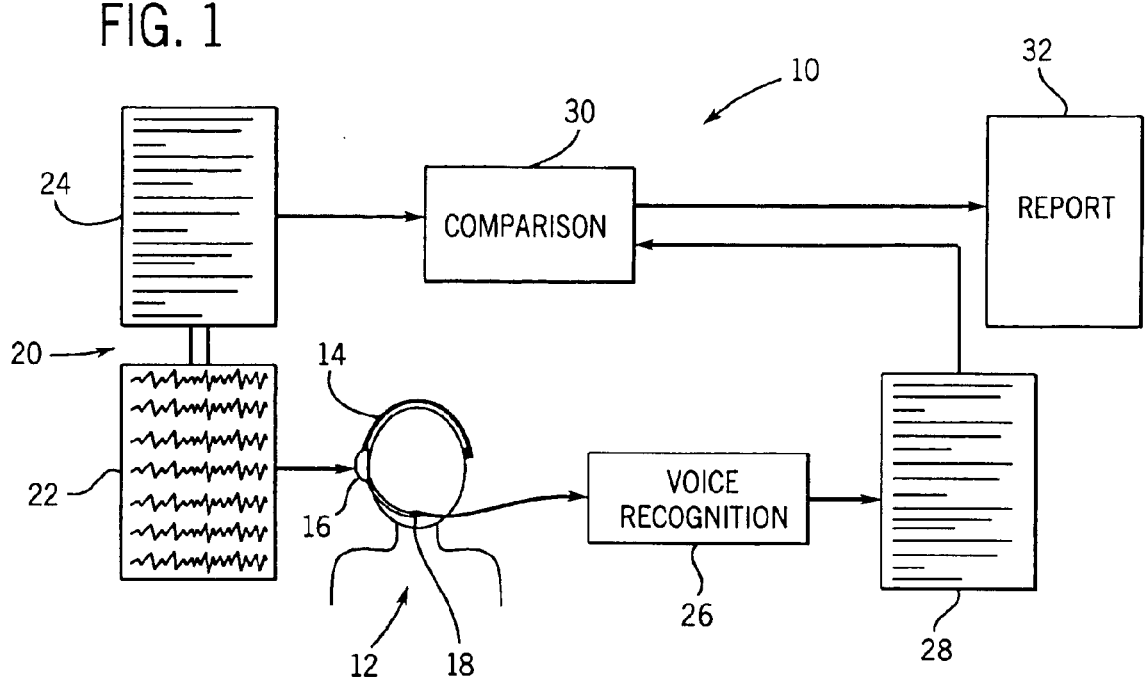
FIG. 1 is a schematic drawing of a call assistant training device showing the linked script, the call assistant, and the resulting output script from the voice recognition system.

Referring to FIG. 1, the present invention is a training method and training device 10 for training a call assistant 12 to facilitate a relay telephone call using a re-voicing technique. The training device 10 allows a call assistant 12 to practice the technique of re-voicing and simulates an actual relay call while producing a report 32 that displays the performance of the call assistant 12 according to various criteria.

During training, a call assistant 12, preferably wearing a headset 14 containing a speaker 16 and a microphone 18, repeats into the microphone 18 what she hears from the speaker 16. The microphone 18 is connected to a voice recognition system 26 that transforms the call assistant's voice into an output text file 28. The training device 10 may be implemented in standard computer hardware, with the microphone and speaker connected through a sound card to the computer and the computer executing a commercially available speech recognition program such as ViaVoice, manufactured by the IBM corporation. The output text file 28 is stored in computer memory.

In an actual relay call, the voice of a hearing caller (not shown) would be transmitted to the speaker 16 to be re-voiced by the call assistant 12, and the output text file 28 would be transmitted to a display device (not shown) to be read by the hearing impaired user (not shown). In contrast, in the simulation of a relay call for training purposes, the training device 10 replaces the voice of a hearing caller with the voice portion 22 of a linked script 20. The linked script 20 also includes of a text portion 24 that is a transcription of the voice portion 22. The voice portion 22 may be standard .wav or other audio type files and the text portion 24 may be ASCII data both stored on a computer disk or the like.

The linked script 20 can be created by having someone read the text portion 24 to create the voice portion 22 or by transcribing a recorded voice portion 22 to create the text portion 24. The voice portion 22 of the linked script 20 can be varied according to criteria such as the average word rate, peak word rate, accent of the speaker and may include non text features such as noises and the like, and may include encounters with automatic menu driven answering machines. In addition, the voice portion 22 and text portion 24 of the linked script 20 can be specifically chosen to include words that are likely to be misinterpreted by the voice recognition system 26 or words common to relay operators not found in the dictionaries of standard speech recognition engines.

Figure 7:
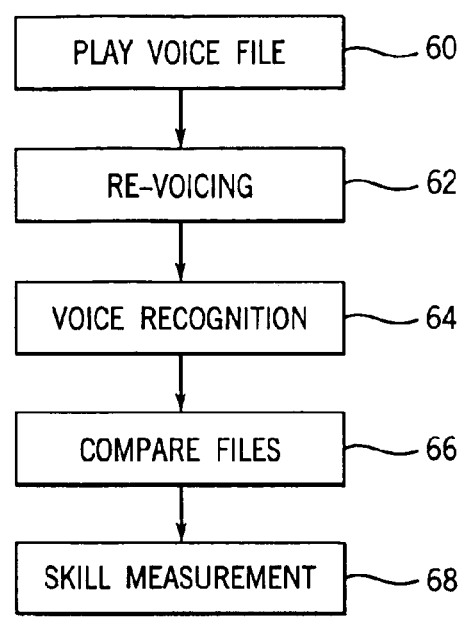
FIG. 7 is a flowchart illustrating the steps in a method for training relay call assistants.

Referring now to FIGS. 1 and 7, once the linked script 20 is created, the training device 10 executes a stored program to play the voice portion 22 of the linked script 20 so that the call assistant 12 can hear it in the speaker 16. This process of playing the voice portion 22 of the linked script 20 is indicated in step 60 of FIG. 7 and involves a playing of the audio file through a standard sound card according to techniques well known in the art. As the call assistant 12 listens to the voice portion 22, she re-voices what she hears from the speaker 16 into the microphone 18. The re-voicing process is summarized in step 62 of FIG. 7. The microphone 18 is connected to a voice recognition system 26 that transforms the voice of the call assistant 12 into an output text file 28 which may be received and stored in the same computer as indicated by step 64 of FIG. 7.

Figure 3:
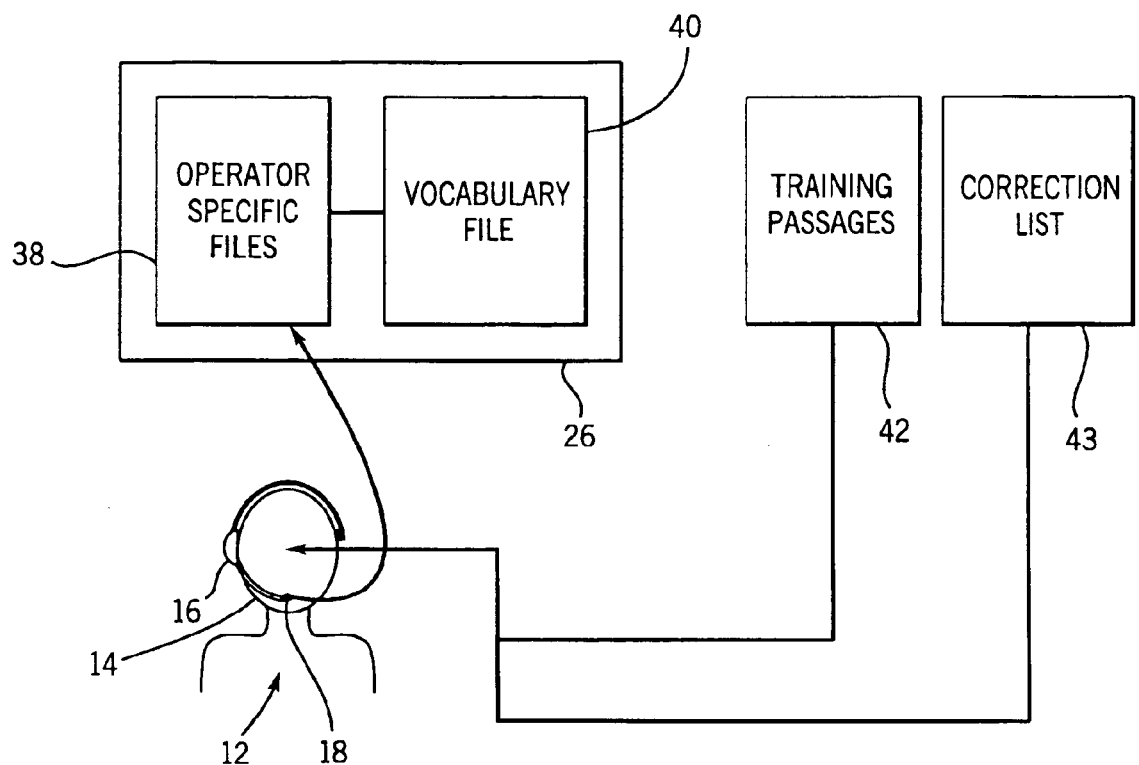
FIG. 3 is a schematic drawing of the component files of the voice recognition system.

Referring now to FIGS. 1 and 3, the voice recognition system 26 contains operator specific files 38 and a vocabulary file 40 to aid in the transformation of the voice of the call assistant 12 into an output text file 28 such as are well understood in the art. The vocabulary file 40 is typically compiled by the manufacturer of the commercially available voice recognition engine (described above) and is not modifiable. It contains a database of commonly used words and representations of their pronunciation to be used by the voice recognition engine in converting spoken words into text. In addition to a vocabulary file 40 of common words, manufacturers of voice recognition engines make available specialized files that contain words commonly used in law, medicine, engineering, etc.

The operator specific files 38 in the voice recognition system 26 contain the speech patterns and inflections of a particular call assistant 12 as well as words and their accompanying pronunciations that are not found in the vocabulary file 40 supplied by the manufacturer of the voice recognition engine. The operator specific files 38 can be created and modified in a standard training process that consists of having the call assistant 12 read pre-selected training passages 42 into a microphone 18 connected to the voice recognition system 26. The call assistant 12 then corrects within the voice recognition system 26 any words that are mistranslated by the voice recognition system 26. Typically, when a commercially available speech recognition system mistranslates a word, the user instructs the speech recognition engine to correct the mistake by supplying the correct word. This occurs both when the speech recognition engine chooses the wrong word from its vocabulary file and when its vocabulary file does not contain the desired word. In this way, the speech recognition engine "learns" new words as well as the specific user's pronunciation patterns. The training passages 42 can be selected so as to include particular words that may be difficult for the voice recognition system 26 to recognize and transcribe accurately, or words that highlight speaker-to-speaker variations in pronunciation.

The operator specific files 38 can also be modified during the correction step of the re-voicing process (described below). When a word is incorrectly translated by the voice recognition system 26, it can be corrected by the call assistant 12 prior to being recorded in the output text file 28. However, the aforementioned correction does not involve the voice recognition system 26 since it only corrects the output of the voice recognition system 26 and not the operator specific files 38, which normally cannot be corrected in commercial voice recognition engines in the time constraints necessary for real-time transcription. Consequently, if the call assistant 12 encounters the same word again in the training process or during an actual relay call, the voice recognition system 26 will again translate the word incorrectly, requiring a manual correction by the call assistant 12 each time the word is used.

This repeated mistranslation could be avoided, however, by modification of the operator specific files 38 in the voice recognition system 26. It is possible to use them same internal correction system of the voice recognition system 26 that is used when reading pre-selected training passages 42 in the voice recognition system 26 (describe above) to modify the operator specific files 38. However, this learning process is time consuming, making it prohibitive to do such a correction within the voice recognition system 26 during a relay call.

It is possible, however, to "train" the voice recognition system 26 without disrupting a relay call. At periodic intervals during the training process (i.e. the end of each day) the correction unit (described in detail below) can be asked to supply a list of words that needed to be corrected in the output text file 28 during the course of a training call. Each call assistant 12 then devises sentences containing each of the corrected words to provide a context for the voice recognition system 26. The call assistant 12 then reads the sentences into the voice recognition system 26 and makes any necessary corrections utilizing the standard correction system of the commercial voice recognition engine. While this process is slow, the correction process does not take place during relay operation. Thus, a call assistant 12 is able to modify the operator specific files 38 without having to disrupt a relay training call or fundamentally modify a commercial speech recognition engine. It should be obvious to one skilled in the art that this process of training the voice recognition system 26 to modify operator specific files 38 without having to disrupt a relay call can also be utilized during actual relay operation as well as during the relay training process.

Figure 4:
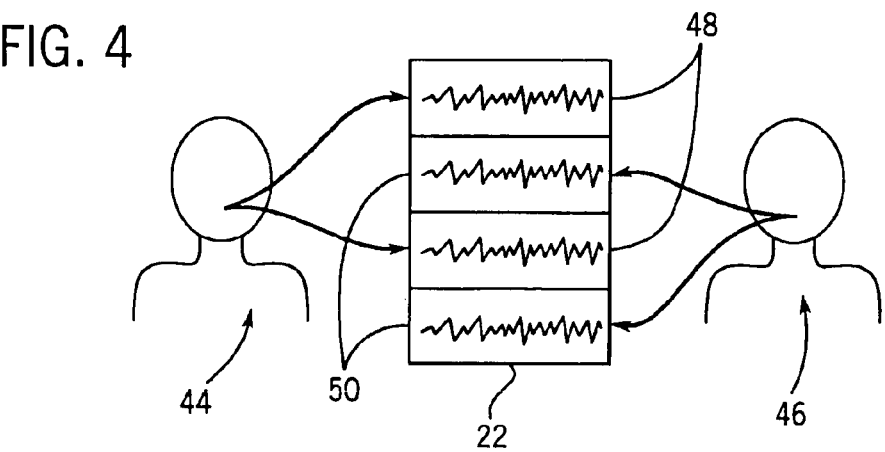
FIG. 4 is a schematic drawing representing a linked script depicting a bi-directional conversation.

Referring now to FIGS. 1 and 4, the linked scripts 20 can be augmented to better prepare the call assistant 12 to handle actual relay calls. Thus the linked script 20 can be not simply a monologue in order for the call assistant 12 practice the technique of re-voicing, but may be a simulated two-person conversation in order for the call assistant 12 to have the illusion of an actual relay call. To simulate a two-person conversation, the voice portion 22 of the linked script 20 is divided into two parts, a first part 48 simulating the contribution to the conversation of a hearing caller 44 and a second part 50 simulating the contribution of a hearing-impaired caller 46. The first part 48 and the second part 50 would alternate so as to simulate a two-way conversation.

The call assistant 12 would re-voice the first part 48, simulating the re-voicing the voice of the hearing caller 44 into text for a hearing-impaired caller 46, but would not re-voice the second part 50, simulating the hearing-impaired caller 46 speaking to the hearing caller 44 without any transcription necessary. The volume of the second part 50 could be lowered or the second part 50 could otherwise be distinguished from the first part 48 to make the re-voicing process easier for the call assistant 12. The training device 10 is programmed so that the second part 50 would not be played until the call assistant 12 had finished re-voicing the first part 48 as indicated by a complete transmission of the text for the first part.

Additionally, the linked scripts 20 can be varied in other ways to prepare the call assistant 12 to handle actual relay calls. For example, the speed of the voice portion 22 can be increased to simulate a caller who speaks very fast. The voice portion 22 can also be varied to simulate a caller who speaks with an accent, has a speech impediment to improve the ability of the call assistant 12 to handle such calls when actually handling relay calls.

Figure 2:
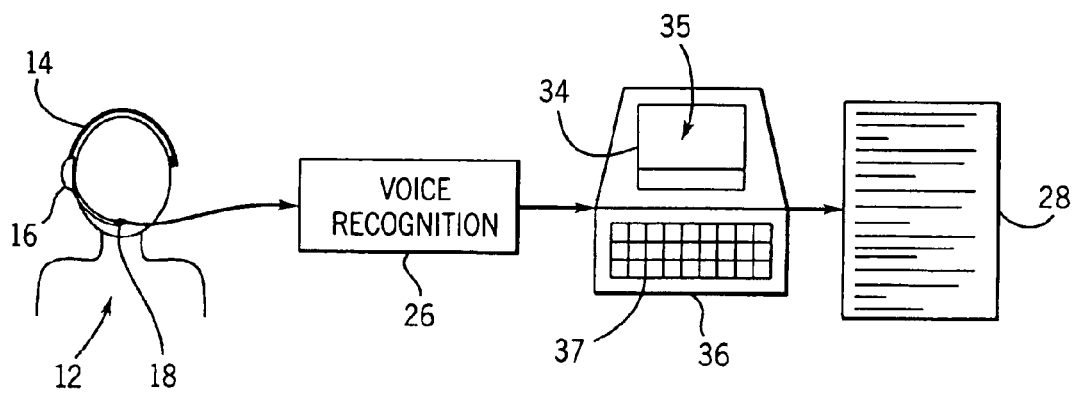
FIG. 2 is a schematic drawing of the process of transforming the re-voicing of the call assistant into an output text file, including the optional step of correcting for errors.
Figure 6:
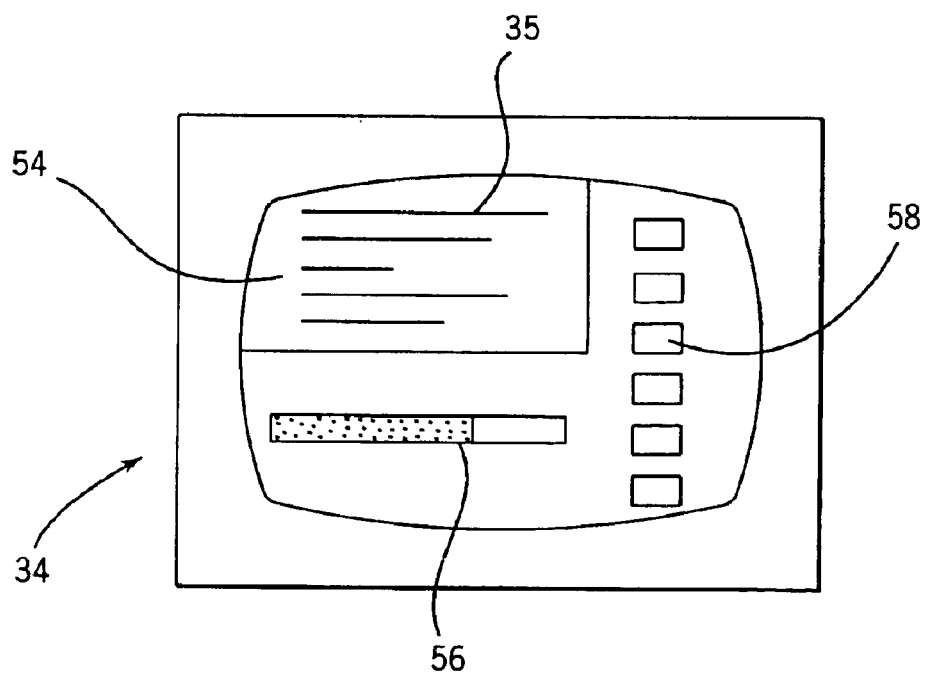
FIG. 6 is detailed view of a display screen in one embodiment of the invention.

Referring now to FIGS. 2 and 6, the training process can include the additional step of correcting transcription errors during re-voicing. This is accomplished by including in the training device 10 a display screen 34 and a correction unit 36 and a correction program operated as follows. As the call assistant 12 re-voices the linked script (not shown) and the voice recognition system 26 transcribes the voice of the call assistant 12, the resulting output text 35 appears on the display screen 34. If the call assistant 12 notices any transcription errors by the voice recognition system 26, she corrects them using a correction unit 36 before the voice recognition system 26 produces an output text file 28. In the preferred embodiment of the invention, the display screen 34 contains a touch screen that allows the call assistant 12 to touch the incorrect word on the screen and type the correct word using a keyboard 37 or to speak the correct word into the microphone 18 and voice recognition system 26 on the correction unit 36. Statistics on the correction process, for example, how many corrections occurred and how quickly the corrections were made, can be incorporated into the report 32 to be described.

In another embodiment of the invention, the display screen 34 can be divided into different sections. One section, the text box 54, can be used to display the output text 35 from the voice recognition system 26 for correction as described above. Other sections can be used for other displays, such as a pause time indicator 56 (described in detail below) or for other functions, such as touch screen buttons 58 to control the function of the training device 10.

Figure 5:
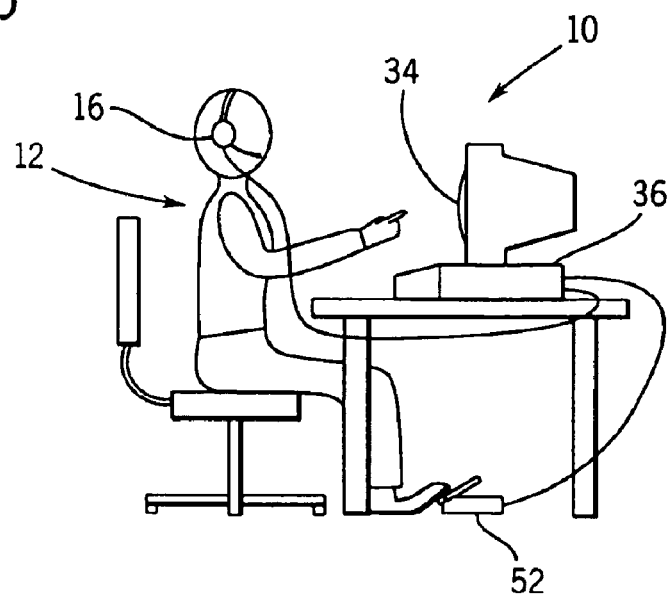
FIG. 5 is side view of a call assistant training device showing a display screen for correcting errors and a foot pedal for pausing the voice playback.

Referring now to FIGS. 1, 5, and 6, the training device 10 includes in one embodiment a foot pedal 52 or other switch to stop the playback of the voice portion 22 of the linked script 20. The ability to pause the voice portion 22 simulates the buffering of the caller's voice in an actual relay system and is necessary if the call assistant 12 lags behind in re-voicing or needs to make a correction. The amount of time that the playback is paused can be displayed on the display screen 34 in the form of a pause time indicator 56 to simulate the amount of voice buffered in a voice buffer on an actual relay system. The statistics of the pause time indicator, e.g. total pause time, peak delay caused by pausing, number of pauses, can be recorded by the system and provided in the report 32.

Referring now to FIGS. 1 and 7, the output text file 28 from the voice recognition system 26 can be compared to the text portion 24 of the linked script 20 using a comparison program 30, also executed on the computer. This step is indicated in step 66 of FIG. 7 and is most easily performed if the same computer system used to play the linked scripts 20 implements the speech recognition engine 26 and receives the output text file 28. The comparison can be made before or after the call assistant 12 has had an opportunity to correct any transcription errors using the process described above and before and after statistics provided in the report 32.

As mentioned above, the comparison program 30 produces a report 32 showing the performance of the call assistant 12 in re-voicing a particular linked script 20 and various performance statistics. The comparison program 30 may be generated by a special program reading the text portion 24 and the output text file 28 as executed by a computer according to methods well understood in the art for comparing text documents to create the report 32. The report can show the performance of the call assistant 12 according to a variety of criteria including the number of words of the text output not matching the text portion of the linked script (errors) and the number of corrections made. If the linked script 20 in a particular training session was a simulated two-part conversation, the comparison program 30 can record the number of times that the call assistant 12 re-voiced the wrong part of the voice portion 22 (i.e. the hearing impaired caller's voice) and display that data on the report 32. The report 32 can also display data acquired from the voice recognition system 26 such as the speed at which the call assistant was able to re-voice and the total time that the playback of the voice portion 22 was paused. Composite measures that combine two or more criteria (e.g., total number of transcribed words—errors, per unit time) can also be calculated by the training device 10 and displayed on the report 32. The measurement of the skill of a call assistant 12 as displayed on the report 32 can be used to measure the performance of the call assistant 12 as she progress through training.

Figure 8:
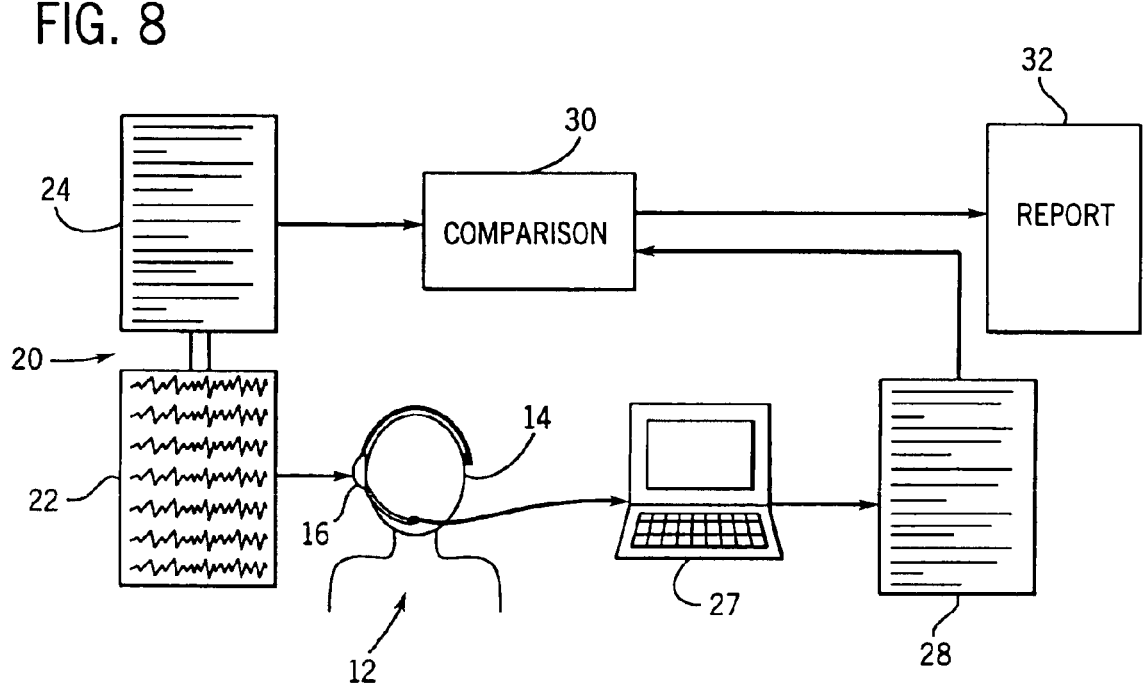
FIG. 8 is a schematic drawing of an alternative embodiment of the invention that does not use a voice recognition system.

Referring now to FIGS. 1 and 8, the training process and device described above can be used in another embodiment to train call assistants 12 in methods of performing a relay call other than the re-voicing technique. For example, in a traditional relay call, the call assistant 12 does not re-voice the hearing person's voice, but instead types what the hearing person says on a standard QWERTY keyboard or in a manner similar to that used by court reporters and the like. In this embodiment of the training device 10, there is no microphone 18 connected to a voice recognition system 26. Instead, there is typing keyboard 27. The choice of typing keyboard 27 or other input device is a matter of user preference and does not change the operation of the training device 10. The output text file 28 obtained from the typing keyboard 27 then sent to the comparison system 30 to be compared with the linked script 20. The output text file 28 of the typing keyboard 27 can then be compared to the text portion 24 of the linked script 20 to obtain a report 32 containing various performance criteria as described above.

It is specifically intended that the present invention not be limited to the embodiments and illustrations contained herein, but that modified forms of those embodiments including portions of the embodiments and combinations of elements of different embodiments also be included as come within the scope of the following claims.

What is claimed is:

1. A method for training an operator for relay re-voicing comprising the steps of:
   (a) communicating a voice portion of a linked script having corresponding text and voice portions to the operator to be trained;
   (b) permitting a re-voicing by the operator of the voice portion to a computerized speech recognition system providing a re-voiced text corresponding to the operator's re-voicing;
   (c) displaying the re-voiced text output to the operator for correction; and
   (d) comparing the text script to the re-voiced text to produce a measure of operator skill.

2. The method as claimed in claim 1, where the measure of operator skill indicates a number of words of the text output not matching the text script.

3. The method as claimed in claim 1, where the measure of operator skill indicates a rate of re-voicing.

4. The method as claimed in claim 1, where the measure of operator skill indicates a composite of rate of re-voicing and a number of words of the text output not matching the text script.

5. The method as claimed in claim 1, where the computerized speech recognition system includes operator specific files and vocabulary files and including the step of training the computerized speech recognition system for a specific operator to generate the operator specific files.

6. The method as claimed in claim 5, where the operator specific files are modified to represent typical telephonic conversation vocabularies.

7. The method as claimed in claim 5, where the step of training the computerized voice recognition system comprises the step of:
   (a) compiling a list of words incorrectly translated by the computerized voice recognition system while re-voicing the text script;
   (b) devising sentences containing those words to provide context for the computerized voice recognition system;
   (c) reading those sentences into the voice recognition system; and
   (d) correcting the incorrectly translated words using the correction function of the computerized voice recognition system.

8. The method as claimed in claim 1, including the further step of accepting from the operator a pause signal causing a ceasing of the communication of the voice portion such as simulates a pausing of a voice buffer recorder.

9. The method as claimed in claim 1, including the further step of displaying to the operator an indication of total pause time such as simulates a buffer capacity display.

10. A method for training an operator for relay re-voicing comprising the steps of:
    (a) communicating a voice portion of a linked script simulating a bi-directional conversation having a first part to be re-voiced and a second part not to be re-voiced;
    (b) permitting a re-voicing by the operator of the voice portion to a computerized speech recognition system providing a re-voiced text output to the operators re-voicing; and
    (c) comparing the text script to the re-voiced text to produce a measure of operator skill.

11. The method as claimed in claim 10, where the voice script is modified for the second part to be distinguishable auditorily.

12. The method as claimed in claim 10, where the measure of operator skill provides a higher measure of operator skill for a number of words of the text output matching the first part of the script and a lower measure of operator skill for a number of words of the text output matching the second part of the script.

13. An apparatus for training a call assistant comprising:
    a set of linked scripts having corresponding text and voice portions simulating different transcription scenarios each of the linked scripts simulating a bi-directional conversation having a first part to be re-voiced and a second part not to be re-voiced;
    a script player communicating the voice portion of a selected script to an operator to be trained;
    a computerized speech recognition system receiving a re-voicing of the voice portion by the operator to produce a re-voiced text output corresponding to the operator's re-voicing; and
    a text comparison device comparing the text portion of the linked script to the re-voiced text output to produce a measure of operator skill identified to the particular selected script.

14. The apparatus as claimed in claim 13, where the scripts differ according to criteria selected from the group consisting of:
    intelligibility of the speaker
    average word rate;
    peak word rate; and
    frequency of words prone to misinterpretation by the computer voice recognition system.

15. The apparatus as claimed in claim 13, where the measure of operator skill indicates a number of words of the text output not matching the text script.

16. The apparatus as claimed in claim 13, where the measure of operator skill indicates a rate of re-voicing.

17. The apparatus as claimed in claim 13, where the measure of operator skill indicates a composite of the rate of re-voicing and a number of words of the text output not matching the text script.

18. The apparatus as claimed in claim 13, further including a display screen to display the re-voiced text output to the operator for correction.

19. The apparatus as claimed in claim 13, where the computerized speech recognition system includes operator specific files and vocabulary files where the operator specific flies are generated and modified by a specific operator.

20. The apparatus as claimed in claim 19, where the operator specific files reflect typical conversational vocabularies.

21. The apparatus as claimed in claim 13, where the voice and text script simulates a bi-directional conversation having a first part to be re-voiced and a second part not to be re-voiced.

22. The apparatus as claimed in claim 21, where the voice script is modified for the second part to distinguishable auditorily.

23. The apparatus as claimed in claim 13, where the measure of operator skill provides a higher measure of operator skill for a number of words of the text output matching first part of the script and a lower measure of operator skill for a number of words matching the second part of the script.

24. The apparatus as claimed in claim 13, further including a switch to allow the operator to transmit a pause signal causing a ceasing of communication of the voice portion such as simulates a pausing of a voice buffer recorder.

25. The apparatus as claimed in claim 24, where the switch is a foot pedal.

26. The apparatus as claimed in claim 14, further including a display for displaying to the operator an indication of total pause time such as simulates a buffer display capacity.

* * * * *

UNITED STATES PATENT AND TRADEMARK OFFICE
CERTIFICATE OF CORRECTION

PATENT NO. : 6,882,707 B2
DATED : April 19, 2005
INVENTOR(S) : Robert M. Engelke et al.

It is certified that error appears in the above-identified patent and that said Letters Patent is hereby corrected as shown below:

Column 8,
Line 54, "flies" should be -- files --.
Lines 58-61, claim 21 should be deleted.

Signed and Sealed this

Twelfth Day of July, 2005

JON W. DUDAS
*Director of the United States Patent and Trademark Office*